Figure 1:
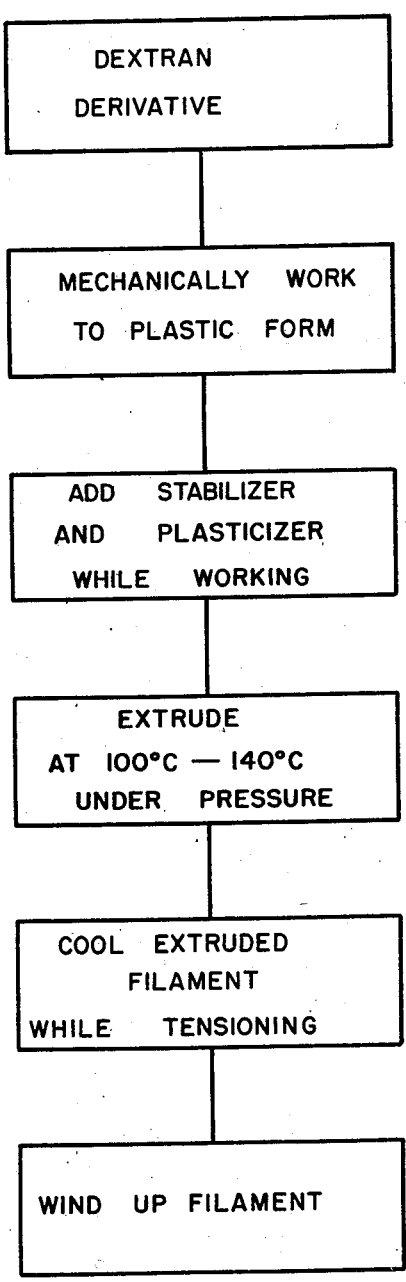
Figure 2:
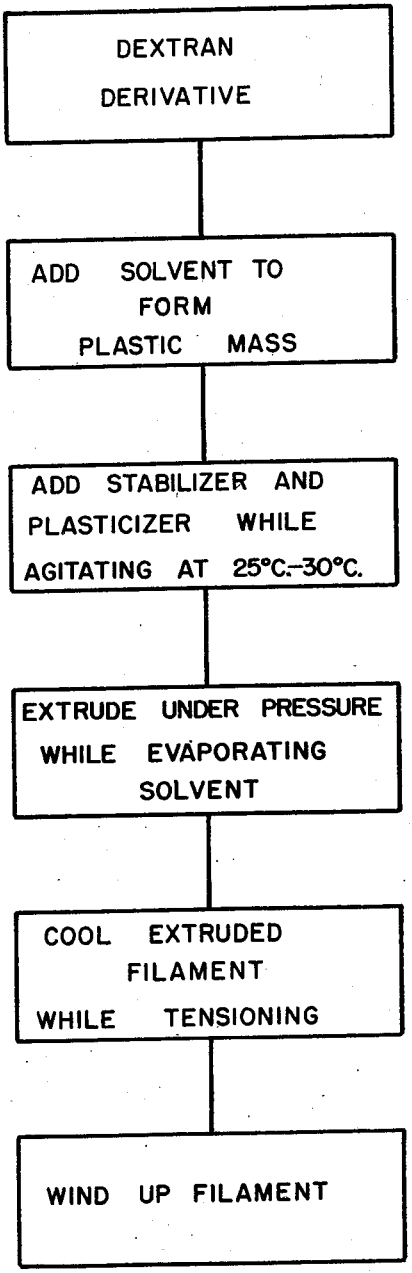

April 23, 1957  A. E. BISHOP  2,789,915
PLASTICIZED BENZYL DEXTRAN AND FILAMENT FORMED THEREFROM
Filed March 14, 1951

INVENTOR
ALFRED E. BISHOP
BY Toulmin & Toulmin
ATTORNEYS

United States Patent Office 2,789,915
Patented Apr. 23, 1957

2,789,915

PLASTICIZED BENZYL DEXTRAN AND FILAMENT FORMED THEREFROM

Alfred E. Bishop, Dayton, Ohio, assignor to The Commonwealth Engineering Company of Ohio, Dayton, Ohio, a corporation of Ohio Application March 14, 1951, Serial No. 215,578

2 Claims. (Cl. 106—162)

This invention relates to the production of filaments and fibers from dextran derivatives. More particularly the invention relates to compositions and to methods of attaining compositions for the production of such filaments and fibers.

Gum dextran is a water soluble colloidal material produced by the action of a genus of micro-organisms such as *Leuconostoc mesenterioides* or *Leuconostoc dextranicus* on polysaccharides such as refined sugar, raw sugar, molasses or any sucrose bearing material. The gum dextran produced by these micro-organisms is a mucilaginous substance having a dextrorotatory value of approximately $a/d$ plus 200, and a mean molecular weight of several million. The high molecular weight is attributed to the co-linkage of a very large number of molecules, the polysaccharide units being built up, it is believed, by the condensation of the gluco-pyranose units into long chains. The formula of dextran is considered to be $(C_6H_{10}O_5)_n$, where $n$ is an integral number.

A preferable method of producing the gum dextran is to first form an aqueous subtrate containing approximately:

| | G. |
|---|---|
| Sucrose | 200.0 |
| Peptone | 5.0 |
| Sodium chloride | 2.0 |
| Di-potassium phosphate | 5.0 |
| Water | 5.0 | and then sterilize this subtrate at a pressure of about 15 pounds per square inch for 20 to 30 minutes. It should be noted that the nutrient ingredients of the above composition may be employed in various ratios and the sucrose content of the media may be varied by from 5 to 20 percent of the total weight of the subtrate. After sterilization the subtrate is seeded with a few cc. of a culture of the *Leuconostoc mesenterioides*. The seeded material is incubated at about 20 to 27 degrees centigrade for a period of about 48 to 96 hours, during which time, that is, after a period of about 60 hours of incubation, the solution becomes quite viscous and light brown in color. Completion of the bacterial action may be determined by various methods, such as the determination of free or unconverted sucrose or by viscosity tests, and when hydrolysis of the sucrose ceases a maximum yield of the dextran has been secured.

The gum dextran itself may then be converted by etherification into ethers and mixed ethers, in numerous ways, such as are described in United States Patents Nos. 2,203,703, 2,203,704, 2,203,705, 2,236,386, 2,344,179 and 2,344,180.

Gum dextran and its derivatives have been found to be of particular interest in the field of medicine due to their immunological properties and are presently of importance with relation to blood plasma substitutes. However, the derivatives of dextran and dextran itself when completely dry are normally a brittle material, having little tensile strength and are generally considered unsuitable for the production of a filament, fiber or thread.

It is an important object of this invention to provide a filament or fiber from dextran derivatives.

It is another object of this invention to provide a filament or fiber from a gum dextran derivative which will retain the immunological properties of the dextran and be useful in the field of medicine and surgery.

It is a primary object of this invention to provide dextran derivative compositions from which such filament or fiber may be prepared.

It is a particular object of this invention to provide methods of attaining gum dextran derivative compositions suitable for the manufacture of a fiber.

These and other objects of the invention are attained by incorporating a suitable plasticizer into a gum dextran derivative and thereafter extruding the composition under controlled conditions through a filament-forming device having a small opening to obtain a filament.

The plasticization of the dextran derivative, that is an ether, may take place with the aid of mechanical means or by solute methods and the plastic mass obtained by either mode when extruded under moderate temperature conditions forms a fine filament which is dried and drawn while cooling. Tensioning of the material during the cooling period affects an alignment of the molecules of the composition resulting upon completion of the cooling in the attaining of a flexible strand of moderate strength.

Dextran derivatives for the practice of the invention may be obtained directly from the culture media containing the dextran which has been described hereinbefore, in which case the product of the etherification will be a mixture of compounds. Thus the mass will contain in addition to ethers of dextran corresponding derivatives of any excess sucrose or metabolic products remaining in the fermented culture media. In many instances this course of procedure may be desirable since a blending of these various derivatives yields a product with a range of solubilities, which may be a desirable feature of the ultimate fiber or filament.

The dextran derivatives may also be obtained from dextran itself, in which case it is necessary to separate the dextran from the culture media before the chemical treatment of esterification or etherification is undertaken. Thus the gum dextran may be isolated from the culture media by slowly adding to the media a precipitating solvent such as methyl, ethyl, propyl or butyl alcohol, acetone or methyl-ethyl ketone.

The precipitating agents are first adjusted to a neutrality of pH 7 and the volume thereof should be about two or three times that of the culture solution. Agitation during the precipitation will facilitate the separation of the dextran from the unused sugars and other fermentation products. This latter method is most desirable where the fiber or filament resulting from the process of invention is to have specific properties, such as those required in the surgical field.

In either case, that is, whether the dextran is treated in the pure form or while in the culture media, the dextran derivative is obtained by treating the dextran with etherifying compounds, such as ethyl chloride, diethyl sulfate, butyl chloride or benzyl chloride. This reaction takes place in an alkaline solution and the rate of the reaction as well as the degree to which the action is allowed to take place may be regulated by control of the time of reaction and the degree of temperature and pressure under which the reaction is conducted. Normally the higher the temperature or pressure and the longer the period of heating, the greater will be the number of hydroxyl groups in the polysaccharide which will be substituted by the halide or other chemical component. The physical nature of the end product will of course be altered somewhat, the rigidity thereof increasing and the solubility decreasing in accordance with the severity of the reaction conditions.

Whether the fermented media are treated directly, or the polysaccharides are first isolated by precipitation, the reactants are usually employed in the ratio of one mol of the polysaccharide material to 3.5 to 6.0 mols of the alkyl or aralkyl halide and approximately 3.5 to 5.0 mols of an alkali such as sodium hydroxide. Where the polysaccharide is first isolated from the culture media before chemical treatment, water must generally be added to the mixture so as to give approximately a 10 percent solution of the alkali.

Separation of the dextran derivatives, that is ethers, formed by the above detailed reaction, may be accomplished by decantation, filtration, or precipitation of the non-soluble forms in alcohols or ketones, or even by steam distillation. The derivatives are washed with water, preferably with mechanical agitation or a kneading action on the amorphous mass. Residual water may be removed from the amorphous product by any of the conventional methods employed for the drying of materials, that is heating, centrifuging or working on a warm mill.

The color of the dry dextran derivative may vary from white to a light tan depending upon the purity and natural color of the basic reaction materials employed. In general, the etherified products will be pliable plastic masses, although some are friable materials when dry.

The polysaccharide material derived from the above noted process is in the practice of the invention preferably placed on a rolling mill or in a kneading type mixer and the material worked into a mass of considerable pliability, whereafter materials such as stabilizers, plasticizers and sizing ingredients are worked into the dextran derivatives to form a homogeneous mass. This plasticized composition may then be placed into extrusion apparatus at room temperature and forced through a die having a temperature in the range of about 100–140 degrees centigrade. A pressure of approximately 80 pounds per square inch will be required to cause the plasticized material to flow through an orifice having an opening diameter of 0.0050 inch. These conditions, of course, will vary somewhat, depending upon the processing factors involved, such as the consistency of the formulated dextran derivative, the rate of extrusion desired, etc.

Under conditions of formation of the ether which produce a product of lesser rigidity and increased solubility, the formulation of the polysaccharide derivatives into a product suitable for the attainment of the fiber, may be accomplished wholly in solution form. Thus after the esters are purified by washing and drying they may be dissolved in a solvent such as methyl alcohol, denatured alcohol, or acetone, preferably while agitating to reduce the time of solution, and the plasticizers, stabilizers and sizing ingredients may be added directly to the solvent form. The composition in this case will be viscous and of a syrup like consistency, the viscosity being controlled by adjustment of the quantity of solvent utilized, as well as the temperature thereof.

The plasticized dextran derivative from the solvent method of formulation is placed in extrusion apparatus maintained at a temperature of about 20 to 40 degrees above the boiling point of the solvent employed in a formulation. Removal of the solvent is effected at this elevated temperature as the filament passes through the die of the extrusion apparatus. Since all of the solvent may not be thus removed a heated air gap is provided at the exit of the die and the material is then either passed over a dryer roll or drum maintained at a temperature of about 90 to 95 degrees centigrade.

When dried the filament is further passed over a cooling drum maintained at about 15 to 20 degrees centigrade, whereby its temperature is lowered rapidly. From the cooling drum the material is passed onto a winding roll, operated at a preferable speed of 20 to 30 percent greater than that of the cooling drum. This speed differential produces a drawing action on the filament after its temperature has been reduced and an orientation or alignment of the molecules is produced in the dextran material which increases the physical properties for its use in filament fiber or thread. The filament produced may then be further treated to obtain a fiber or thread or may be incorporated with filaments of other materials to produce a composite fiber or thread in accordance with standard spinning and weaving practices.

The invention may be more fully understood by reference to the accompanying flow sheet and the following specific examples which are given by way of illustration only and are not intended to limit the invention thereto.

*Example I*

Benzyl ether prepared as described hereinbefore and in accordance with known methods was plasticized on a rolling mill, with ingredients in parts by weight in the following proportions:

| | Parts |
|---|---|
| Benzyl ether of dextran | 100.0 |
| Adipic acid | 0.5 |
| Dibutylphthalate | 25.0 |
| Dibasic lead stearate | 2.5 |

*Example II*

A benzyl ether of dextran similar to that set forth in Example I, was compounded on a roll mill with the following components in parts by weight:

| | Parts |
|---|---|
| Benzyl ether of dextran | 100.0 |
| Castor oil | 1.0 |
| Dioctylphthalate | 20.0 |
| Aluminum stearate | 1.5 |

Each of the foregoing compositions of Examples I and II provides a plastic mass which when placed in an extrusion apparatus of the type known to the art, under a pressure of approximately 80 pounds per square inch, is extruded through an orifice having a diameter of approximately 0.0050 of an inch. The temperature of the die is held at about 100 to 140 degrees centigrade to assure of adequate flow through the orifice. In each case the filamentary strand coming from the die is drawn first over a cooling roll and then over a winding roll operating at somewhat greater speed than the cooling drum, thereby establishing a differential and placing the extruded strand in tension. The slight tension results in an alignment of the molecules of the strand and upon complete setting the material is flexible and suitable for further formation into yarns by combination of several of the filaments in accordance with known methods.

*Example III*

A benzyl ether of dextran was prepared as hereinbefore noted, but with less stringent time and temperature conditions in the etherification, was solved and treated with the following components in parts by weight:

| | Parts |
|---|---|
| Benzyl ether of dextran | 100.0 |
| Methyl alcohol | 65.0 |
| Oioctyl phosphate | 15.0 |
| Dibutyl phthalate | 10.0 |
| Wax | 0.5 |
| Di-basic lead phosphite | 0.5 |

In Example III, the viscous formulations containing solvents were passed to an extrusion apparatus having a small extrusion orifice and maintained at a temperature of about 20 to 40 degrees above the boiling point of the particular solvent employed in the formulation. Pressure was applied to the material and the mass was forced through a die and a heated air gap, solvent evaporation taking place throughout the process. In general, the solvent was not completely removed by this operation and it was accordingly necessary to pass the material over a dryer roll or drum maintained at about 90 to 95 degress centigrade. Upon leaving the dryer the filament was passed over a cooling drum maintained at about 15 to 20 degrees centigrade, whereby its temperature was rapidly lowered. The filament was then picked up by a winding roll operating at a surface speed 20 to 30 percent greater than that of the cooling drum, thus establishing a differential and providing for a slight tensioning of the filament in the cooled condition. Orientation or alignment of the molecules is produced by this slight tensioning, thus rendering the physical properties of the filament particularly suitable for use in thread form. After the material has been tensioned and wound, it is ready for use in the manufacture of fibers and threads in accordance with standard spinning and weaving practices.

The thread thus formed by either of the above noted methods may be particularly suitable for surgical applications the choice of plasticizer and stabilizer governing the specific use to some extent. Thus where the thread is to be used in conjunction with treatment of the body the chemical ingredients of the thread must be compatible therewith. In the foregoing examples this latter feature has dominated the selection of materials and accordingly the threads formed therefrom may be adapted for this specific purpose.

However, for given applications other components may be worked into the plastic mass prior to extrusion to give to the resultant product enhanced characteristics, that is, high strength with low elongation, high flexibility, and so forth.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

I claim:

1. As a new composition of matter adapted to be formed into filaments having a dextran derivative base, a plastic, extrudable, filament-forming mass comprising an intimate mixture of, by weight, approximately 100.0 parts of benzyl ether of dextran, 0.5 part of adipic acid, 25.0 parts of dibutyl phthalate and 2.5 parts of dibasic lead stearate.

2. A plasticized, stretched filament comprising a benzyl ether of dextran and a plasticizing amount of dibutyl phthalate.

References Cited in the file of this patent

UNITED STATES PATENTS

| | | |
|---|---|---|
| 2,056,795 | Macht et al. | Oct. 6, 1936 |
| 2,203,705 | Stahly et al. | June 11, 1940 |
| 2,236,386 | Stahly et al. | Mar. 25, 1941 |
| 2,289,520 | Reichel et al. | July 14, 1942 |
| 2,328,036 | Stahly et al. | Aug. 3, 1943 |
| 2,344,180 | Stahly et al. | Mar. 14, 1944 |
| 2,354,745 | Dreyfus | Aug. 1, 1944 |